US012307889B2

(12) United States Patent
Zhou (10) Patent No.: US 12,307,889 B2
(45) Date of Patent: May 20, 2025

(54) TRAFFIC INDICATION INFORMATION DETERMINING METHOD AND APPARATUS

(71) Applicant: Shenzhen Yinwang Intelligent Technologies Co., Ltd., Shenzhen (CN)

(72) Inventor: Zheng Zhou, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 17/865,883

(22) Filed: Jul. 15, 2022

(65) Prior Publication Data

US 2022/0351618 A1 Nov. 3, 2022

Related U.S. Application Data

(63) Continuation of application No. PCT/CN2021/070609, filed on Jan. 7, 2021.

(30) Foreign Application Priority Data

Jan. 16, 2020 (CN) .......................... 202010049550.8

(51) Int. Cl.
  *G01S 13/58* (2006.01)
  *G08G 1/095* (2006.01)
(52) U.S. Cl.
  CPC .................... *G08G 1/095* (2013.01)
(58) Field of Classification Search
  None
  See application file for complete search history.

(56) References Cited

U.S. PATENT DOCUMENTS

| 11,321,573 B1* | 5/2022 | Wendel | B60W 30/00 |
| 2013/0155237 A1* | 6/2013 | Paek | G06F 3/0487 |
| | | | 348/148 |

(Continued)

FOREIGN PATENT DOCUMENTS

| CN | 103593990 A | 2/2014 |
| CN | 104504917 A | 4/2015 |

(Continued)

OTHER PUBLICATIONS

TC 22/SC 31, ISO/WD 23150:2019(E), Road vehicles—Data communication between sensors and data fusion unit for automated driving functions—Logical interface; Feb. 19, 2019, 176 pages.

*Primary Examiner* — John F Mortell
(74) *Attorney, Agent, or Firm* — Conley Rose, P.C.

(57) ABSTRACT

A traffic indication information determining method includes: obtaining n pieces of first traffic indication information from n sensors, where the first traffic indication information is used to indicate traffic indication information of a traffic command target, the traffic indication information is used to provide a road traffic rule for a vehicle, and n is an integer greater than or equal to 1; and determining second traffic indication information based on the n pieces of first traffic indication information. In the method, the n pieces of first traffic indication information of the traffic command target are obtained based on the n sensors, and then the second traffic indication information used when the vehicle actually travels is determined based on the n pieces of first traffic indication information.

20 Claims, 2 Drawing Sheets

Obtain n pieces of first traffic indication information from n sensors — S101

Determine second traffic indication information based on the n pieces of first traffic indication information — S102

(56) References Cited

U.S. PATENT DOCUMENTS

| | | | |
|---|---|---|---|
| 2016/0144867 A1* | 5/2016 | Delp | B60W 30/181 |
| | | | 701/28 |
| 2016/0252607 A1* | 9/2016 | Saboo | G01S 13/02 |
| | | | 342/107 |
| 2019/0080186 A1 | 3/2019 | Zhai et al. | |
| 2019/0278273 A1 | 9/2019 | Behrendt et al. | |

FOREIGN PATENT DOCUMENTS

| | | |
|---|---|---|
| CN | 105632216 A | 6/2016 |
| CN | 105654045 A | 6/2016 |
| CN | 105678316 A | 6/2016 |
| CN | 107170251 A | 9/2017 |
| CN | 109389838 A | 2/2019 |
| CN | 110659543 A | 1/2020 |
| EP | 4040423 A1 | 8/2022 |
| WO | 2016043781 A1 | 3/2016 |

\* cited by examiner

TRAFFIC INDICATION INFORMATION DETERMINING METHOD AND APPARATUS

CROSS-REFERENCE TO RELATED APPLICATIONS

This is a continuation of International Patent Application No. PCT/CN2021/070609 filed on Jan. 7, 2021, which claims priority to Chinese Patent Application No. 202010049550.8 filed on Jan. 16, 2020. The disclosures of the aforementioned applications are hereby incorporated by reference in their entireties.

TECHNICAL FIELD

This disclosure relates to the field of automated driving technologies, and in particular, to a traffic indication information determining method and apparatus.

BACKGROUND

In the automated driving technologies, traffic indication information in front of a running vehicle needs to be determined in real time, so that a road traffic rule is clarified by using the traffic indication information. Subsequently, traveling control information of the vehicle is generated with reference to the traffic indication information, to accurately control traveling of the vehicle.

A sensor used in an automated driving system recognizes only traffic signal light information. Therefore, only traffic signal light information in front of a running vehicle is obtained. Subsequently, traffic indication information is determined based on only the obtained traffic signal light information. In some application scenarios, traffic indication information commanded by a traffic police officer on the site has a higher priority. However, an existing sensor does not recognize the traffic indication information of the traffic police officer, and determines traffic indication information based on only the traffic signal light information. As a result, the determined traffic indication information is inaccurate, and a security risk exists when a vehicle travels based on the traffic indication information.

SUMMARY

Embodiments of this disclosure provide a traffic indication information determining method and apparatus, to resolve a problem that traffic indication information used by a traveling vehicle is inaccurate because traffic indication information of a traffic police officer is not recognized.

According to a first aspect, an embodiment of this disclosure provides a traffic indication information determining method. The method includes obtaining n pieces of first traffic indication information from n sensors, where the first traffic indication information is used to indicate traffic indication information of a traffic command target, the traffic indication information is used to provide a road traffic rule for a vehicle, and n is an integer greater than or equal to 1, and determining second traffic indication information based on the n pieces of first traffic indication information.

In this implementation, each of the n sensors is used to obtain one piece of first traffic indication information, to obtain a total of n pieces of first traffic indication information. Then, the second traffic indication information is determined based on the n pieces of first traffic indication information. The first traffic indication information is traffic indication information that is provided by the traffic command target (for example, a traffic police officer) and measured by each sensor. Each piece of the first traffic indication information may provide a road traffic rule for the vehicle. The second traffic indication information is more accurate traffic indication information of the traffic command target obtained by comprehensively considering the n pieces of first traffic indication information. It can be learned that, in this solution, the traffic indication information of the traffic command target can be recognized, and more traffic indication information is provided in a traveling process of the vehicle, so that the vehicle travels more safely.

With reference to the first aspect, in a first possible implementation of the first aspect, the traffic command target is a traffic police officer.

In this implementation, because the traffic police officer, as the traffic command target, can analyze a traveling environment of the vehicle more flexibly and accurately, the vehicle can obtain more accurate traffic indication information, and traveling is safer.

With reference to the first aspect, in a second possible implementation of the first aspect, the method further includes obtaining, from the n sensors, at least one of confidence information, tracking status information, time information, and location information of the traffic command target that correspond to each piece of the first traffic indication information.

In this implementation, when the first traffic indication information is obtained, the confidence information, the tracking status information, the time information, and the location information of the traffic command target that correspond to the first traffic indication information are further obtained, and subsequently, traffic indication information used when the vehicle actually travels can be quickly and accurately determined based on the foregoing information. Applicability is better.

With reference to the first aspect, in a third possible implementation of the first aspect, the method further includes sending the location information of the traffic command target and the time information to m sensors, where the m sensors are different from the n sensors.

In this implementation, after the confidence information, the tracking status information, the time information, and the location information of the traffic command target that correspond to the first traffic indication information are obtained, the location information of the traffic command target and the time information are further sent to the m sensors different from the n sensors, and subsequently, the m sensors may check the first traffic indication information, to obtain more accurate traffic indication information used for actual traveling of the vehicle.

With reference to the first aspect, in a fourth possible implementation of the first aspect, the method further includes obtaining m pieces of third traffic indication information from the m sensors, where the third traffic indication information is traffic indication information determined based on the location information and the time information, and m is an integer greater than or equal to 1.

In this implementation, the m pieces of third traffic indication information may be obtained from the m sensors, and subsequently, the first traffic indication information may be checked based on the third traffic indication information, to obtain more accurate traffic indication information used for actual traveling of the vehicle.

With reference to the first aspect, in a fifth possible implementation of the first aspect, the determining second traffic indication information based on the n pieces of first traffic indication information includes determining the second traffic indication information based on the n pieces of first traffic indication information and the m pieces of third traffic indication information.

In this implementation, the m pieces of third traffic indication information obtained by using the m sensors are used to check the n pieces of first traffic indication information obtained by using the n sensors, to obtain more accurate second traffic indication information used for actual traveling of the vehicle, so that the vehicle travels more safely.

With reference to the first aspect, in a sixth possible implementation of the first aspect, the method further includes obtaining traffic signal light information, where the traffic signal light information is used to determine the second traffic indication information.

In this implementation, both the traffic indication information of the traffic command target and the traffic signal light information are considered in the second traffic indication information used for actual traveling of the vehicle. The second traffic indication information is more accurate. It is safer when the vehicle travels based on the second traffic indication information.

According to a second aspect, an embodiment of this disclosure provides a traffic indication information determining method. The method includes obtaining first information from a sensor, where the first information includes first indication information, and the first indication information is used to indicate a traffic command target, and the first information further includes detection information, and time information and location information that are in the detection information and that correspond to the traffic command target, and determining first traffic indication information based on the first information, where the first traffic indication information is used to provide a road traffic rule for a vehicle.

In this implementation, a central processing unit (CPU) may obtain the first information from the sensor. The first information includes the first indication information, the detection information, and the time information and the location information that are in the detection information and that correspond to the traffic command target. After obtaining the first information, the CPU may determine, by using the first indication information in the first information, whether there is the traffic command target. When there is the traffic command target, the CPU may obtain, from the detection information based on the time information and the location information of the traffic command target, traffic indication information of the traffic command target, namely, the first traffic indication information. The first traffic indication information may provide the road traffic rule for the vehicle. When there is the traffic command target (for example, a traffic police officer), the traffic indication information of the traffic command target usually has a highest priority. Therefore, it is safer when the vehicle travels according to the road traffic rule provided by the first traffic indication information. Then, the first traffic indication information that provides the road traffic rule when the vehicle actually travels is determined based on the first information. Because the detection information of the traffic command target is considered in the first traffic indication information, a result is more accurate. It is safer when the vehicle travels based on the first traffic indication information.

With reference to the second aspect, in a first possible implementation of the second aspect, the traffic command target is the traffic police officer.

In this implementation, because the traffic police officer, as the traffic command target, can analyze a traveling environment of the vehicle more flexibly and accurately, the vehicle can obtain more accurate traffic indication information, and traveling is safer.

With reference to the second aspect, in a second possible implementation of the second aspect, the determining first traffic indication information based on the first information includes obtaining traffic signal light information, and determining the first traffic indication information based on the traffic signal light information and the first information.

In this implementation, both the traffic indication information of the traffic command target and the traffic signal light information are considered in the first traffic indication information for actual traveling of the vehicle. The first traffic indication information is more accurate. It is safer when the vehicle travels based on the first traffic indication information.

According to a third aspect, an embodiment of this disclosure provides a traffic indication information determining apparatus. The apparatus includes an obtaining module configured to obtain n pieces of first traffic indication information from n sensors, where the first traffic indication information is used to indicate traffic indication information of a traffic command target, the traffic indication information is used to provide a road traffic rule for a vehicle, and n is an integer greater than or equal to 1, and a determining module configured to determine second traffic indication information based on the n pieces of first traffic indication information.

The apparatus in this implementation can obtain one piece of first traffic indication information from each of the n sensors, to obtain a total of n pieces of first traffic indication information, and then can determine the second traffic indication information based on the n pieces of first traffic indication information. The first traffic indication information is traffic indication information provided by the traffic command target (for example, a traffic police officer), and each piece of the first traffic indication information may provide a road traffic rule for the vehicle. The second traffic indication information is more accurate traffic indication information of the traffic command target obtained by comprehensively considering the n pieces of first traffic indication information. The vehicle travels according to a road traffic rule corresponding to the second traffic indication information. It can be learned that the apparatus can recognize the traffic indication information of the traffic command target, and provide more traffic indication information in a traveling process of the vehicle, so that the vehicle travels more safely.

With reference to the third aspect, in a first possible implementation of the third aspect, the traffic command target is a traffic police officer.

According to the apparatus in this implementation, because the traffic police officer, as the traffic command target, can analyze a traveling environment of the vehicle more flexibly and accurately, the vehicle can obtain more accurate traffic indication information, and traveling is safer.

With reference to the third aspect, in a second possible implementation of the third aspect, the obtaining module is further configured to obtain, from the n sensors, at least one of confidence information, tracking status information, time information, and location information of the traffic command target that correspond to each piece of the first traffic indication information.

In addition to obtaining the first traffic indication information, the apparatus in this implementation further obtains the confidence information, the tracking status information, the time information, and the location information of the traffic command target that correspond to the first traffic indication information, and subsequently, the apparatus can quickly and accurately determine, based on the foregoing information, traffic indication information used when the vehicle actually travels. Applicability is better.

With reference to the third aspect, in a third possible implementation of the third aspect, the apparatus further includes a sending module configured to send the location information of the traffic command target and the time information to m sensors, where the m sensors are different from the n sensors.

After obtaining the confidence information, the tracking status information, the time information, and the location information of the traffic command target that correspond to the first traffic indication information, the apparatus in this implementation further sends the location information of the traffic command target and the time information to the m sensors different from the n sensors, and subsequently, the apparatus can check the first traffic indication information by using the m sensors, to obtain more accurate traffic indication information used for actual traveling of the vehicle.

With reference to the third aspect, in a fourth possible implementation of the third aspect, the obtaining module is further configured to obtain m pieces of third traffic indication information from the m sensors, where the third traffic indication information is traffic indication information determined based on the location information and the time information, and m is an integer greater than or equal to 1.

The apparatus in this implementation may obtain the m pieces of third traffic indication information from the m sensors, and subsequently, the apparatus may check the first traffic indication information based on the third traffic indication information, to obtain more accurate traffic indication information used for actual traveling of the vehicle.

With reference to the third aspect, in a fifth possible implementation of the third aspect, the determining module is further configured to determine the second traffic indication information based on the n pieces of first traffic indication information and the m pieces of third traffic indication information.

The apparatus in this implementation checks the n pieces of first traffic indication information obtained by the n sensors by using the m pieces of third traffic indication information obtained by the m sensors, to obtain the more accurate second traffic indication information used for actual traveling of the vehicle. The vehicle travels more safely.

With reference to the third aspect, in a sixth possible implementation of the third aspect, the obtaining module is further configured to obtain traffic signal light information, where the traffic signal light information is used to determine the second traffic indication information.

According to the apparatus in this implementation, both the traffic indication information of the traffic command target and the traffic signal light information are considered in the second traffic indication information obtained for actual traveling of the vehicle. The second traffic indication information is more accurate. It is safer when the vehicle travels based on the second traffic indication information.

According to a fourth aspect, an embodiment of this disclosure provides a traffic indication information determining apparatus, where the apparatus includes an obtaining module configured to obtain first information from a sensor, where the first information includes first indication information, the first indication information is used to indicate a traffic command target, and the first information further includes detection information, and time information and location information that are in the detection information and that correspond to the traffic command target, and a determining module configured to determine first traffic indication information based on the first information, where the first traffic indication information is used to provide a road traffic rule for a vehicle.

The apparatus in this implementation may obtain the first information from the sensor. The first information includes the first indication information, the detection information, and the time information and the location information that are in the detection information and that correspond to the traffic command target. After obtaining the first information, the apparatus may determine, by using the first indication information in the first information, whether there is the traffic command target. When there is the traffic command target, the apparatus may obtain, from the detection information based on the time information and the location information of the traffic command target, traffic indication information of the traffic command target, namely, the first traffic indication information. The first traffic indication information may provide the road traffic rule for the vehicle. When there is the traffic command target (for example, a traffic police officer), the traffic indication information of the traffic command target usually has a highest priority. In this case, the first traffic indication information determined by the apparatus is more accurate. It is safer when the vehicle travels according to the road traffic rule provided by the first traffic indication information.

With reference to the fourth aspect, in a second possible implementation of the fourth aspect, the obtaining module is further configured to obtain traffic signal light information, and the determining module is further configured to determine the first traffic indication information based on the traffic signal light information and the first information.

According to the apparatus in this implementation, both the traffic indication information of the traffic command target and the traffic signal light information are considered in the first traffic indication information obtained for actual traveling of the vehicle. The first traffic indication information is more accurate. It is safer when the vehicle travels based on the first traffic indication information.

According to a fifth aspect, an embodiment of this disclosure provides an apparatus. The apparatus includes a processor. The processor is configured to be coupled to a memory, read instructions in the memory, and perform, according to the instructions, the method in the first aspect and the possible implementations of the first aspect.

According to a sixth aspect, an embodiment of this disclosure provides an apparatus. The apparatus includes a processor. The processor is configured to be coupled to a memory, read instructions in the memory, and perform, according to the instructions, the method in the second aspect and the possible implementations of the second aspect.

According to a seventh aspect, an embodiment of this disclosure provides a computer storage medium. The computer storage medium stores instructions. When the instructions are run on a computer, the computer is enabled to perform some or all steps of the method in the first aspect and the possible implementations of the first aspect.

According to an eighth aspect, an embodiment of this disclosure provides a computer storage medium. The computer storage medium stores instructions. When the instructions are run on a computer, the computer is enabled to perform some or all steps of the method in the second aspect and the possible implementations of the second aspect.

According to a ninth aspect, an embodiment of this disclosure provides a computer program product. When the computer program product is run on a computer, the computer is enabled to perform some or all steps of the method in the first aspect and the possible implementations of the first aspect.

According to a tenth aspect, an embodiment of this disclosure provides a computer program product. When the computer program product is run on a computer, the computer is enabled to perform some or all steps of the method in the second aspect and the possible implementations of the second aspect.

To resolve the other approaches problem that traffic indication information used by a traveling vehicle is inaccurate because traffic indication information of a traffic police officer is not recognized, embodiments of this disclosure provide a traffic indication information determining method and apparatus. In the method, each of n sensors is used to obtain one piece of first traffic indication information, to obtain a total of n pieces of first traffic indication information. Then, second traffic indication information is determined based on the n pieces of first traffic indication information. The first traffic indication information is traffic indication information provided by a traffic command target (for example, a traffic police officer). Each piece of the first traffic indication information may provide a road traffic rule for a vehicle. The second traffic indication information is more accurate traffic indication information of the traffic command target obtained by comprehensively considering the n pieces of first traffic indication information. The vehicle travels according to a road traffic rule corresponding to the second traffic indication information. It can be learned that in the embodiments, the traffic indication information of the traffic command target can be recognized, and more traffic indication information is provided in a traveling process of the vehicle, so that the vehicle travels more safely.

DESCRIPTION OF EMBODIMENTS

The following describes the technical solutions of this disclosure with reference to accompanying drawings.

In descriptions of this disclosure, unless otherwise specified, "I" means "or". For example, A/B may represent A or B. A term "and/or" in this specification describes only an association relationship between associated objects and indicates that there may be three relationships. For example, A and/or B may represent the following three cases: only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this disclosure, a term such as "example" or "for example" is used to represent giving an example, an illustration, or a description. Any embodiment or design solution described by using "example" or "for example" in this disclosure shall not be construed as being more preferred or more advantageous than another embodiment or design solution. Exactly, use of the term such as "example" or "for example" is intended to present a related concept in a specific manner.

First, a traffic indication information determining system according to this disclosure is described. A traffic indication information determining method according to this disclosure may be implemented in the system.

Figure 1:
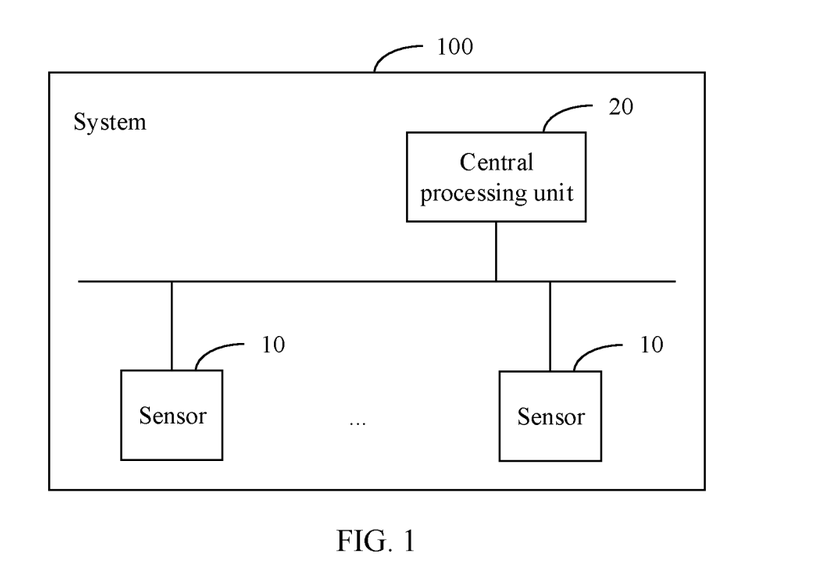
FIG. 1 is a block diagram of a structure of a traffic indication information determining system according to an implementation of this disclosure.

FIG. 1 is a block diagram of a structure of a traffic indication information determining system according to an implementation of this disclosure. With reference to FIG. 1, it can be learned that the system 100 may include a sensor 10 and a CPU 20. There may be at least one sensor 10. The sensor 10 may be a camera apparatus installed on a vehicle, and is configured to capture an image of a traveling environment in which the vehicle is located, and determine traffic indication information of a traffic command target based on the captured image. The sensor 10 may alternatively be a radar installed on a vehicle, for example, a laser radar or an in-vehicle radar configured to emit a laser or an electromagnetic wave to the traveling environment in which the vehicle is located, generate radar detection information based on an echo of the laser or the electromagnetic wave, and determine traffic indication information of a traffic command target based on the radar detection information. The sensor 10 may alternatively be a traffic command target control apparatus. The control apparatus may include a camera apparatus and/or a radar. The control apparatus may be configured to obtain traffic indication information of a traffic command target, and transmit the traffic indication information to the CPU 20 by using a vehicle to everything (V2X) apparatus connected to the control apparatus. The sensor 10 may alternatively be a road side unit (RSU) disposed in a road sign infrastructure. The road side unit may include a camera apparatus and/or a radar. The road side unit may be configured to obtain traffic indication information of a traffic command target, and transmit the traffic indication information to the CPU 20 by using a V2X apparatus connected to the road side unit. The sensor 10 may be further configured to obtain traffic signal light information. The CPU 20 may be a CPU installed on the vehicle, and is configured to obtain information transmitted by the sensor 10, and fuse the information transmitted by the sensor 10, to determine traffic indication information required when the vehicle actually travels.

The traffic command target may be a traffic police officer, or may be a device that has a function of replacing a traffic police officer to perform traffic command. This is not limited in this disclosure. The traffic indication information is used to provide a road traffic rule for the vehicle.

A person skilled in the art may understand that the structure of the traffic indication information determining system shown in FIG. 1 does not constitute a limitation on the traffic indication information determining system in this disclosure. The traffic indication information determining system in this disclosure may include more or fewer components than those shown in the figure, or may combine some components, or may have different component arrangements. Components shown in the figure may be implemented in hardware, software, or a combination thereof.

The following describes embodiments of traffic indication information determining methods according to this disclosure.

Figure 2:
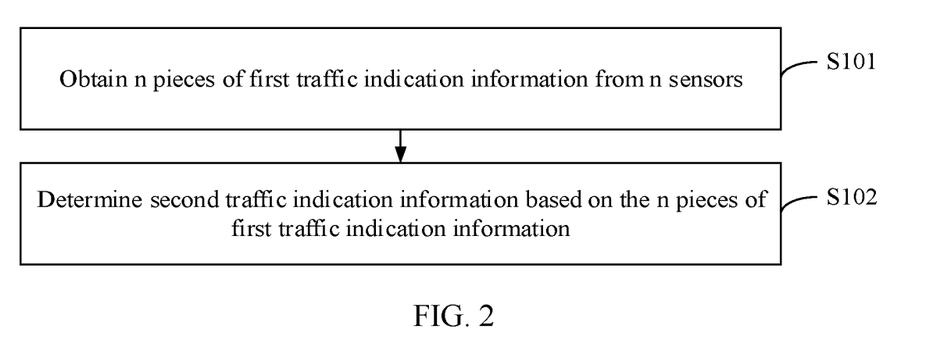
FIG. 2 is a schematic flowchart of a traffic indication information determining method according to an implementation of this disclosure.

FIG. 2 is a schematic flowchart of a traffic indication information determining method according to an implementation of this disclosure. An execution body of the method may be a CPU. With reference to FIG. 2, it can be learned that the method includes the following steps.

Step S101: Obtain n pieces of first traffic indication information from n sensors.

The first traffic indication information is used to indicate traffic indication information of a traffic command target, the traffic indication information is used to provide a road traffic rule for a vehicle, and n is an integer greater than or equal to 1. The obtaining n pieces of first traffic indication information from n sensors means that one piece of first traffic indication information is obtained from each of the n sensors, to obtain a total of n pieces of first traffic indication information.

There may be a plurality of implementations of obtaining the n pieces of first traffic indication information from the n sensors.

Optionally, the n sensors may be camera apparatuses, and the obtaining n pieces of first traffic indication information from n sensors may be implemented in the following manner. Each of the n camera apparatuses captures an image of a traveling environment in which the vehicle is located, to obtain n frames of images. Each of the n camera apparatuses obtains gesture information of the traffic command target based on the image obtained by the camera apparatus, to obtain n pieces of gesture information. Each of the n camera apparatuses determines first traffic indication information of the traffic command target based on the gesture information obtained by the camera apparatus, to obtain n pieces of first traffic indication information. Each of the n camera apparatuses sends the corresponding first traffic indication information to the CPU. The CPU receives the first traffic indication information sent by each of the n camera apparatuses, to obtain the n pieces of first traffic indication information.

The gesture information may include one or more of the following information: a direction and an angle of deflection of a hand of the traffic police officer towards a forearm, a direction and an angle of deflection of a forearm of the traffic police officer towards an upper arm, a direction and an angle of deflection of an upper arm of the traffic police officer towards the trunk, a direction and an angle of deflection between the head and the trunk of the traffic police officer, and an orientation of the trunk of the traffic police officer.

Optionally, the n sensors may alternatively be radars, and the obtaining n pieces of first traffic indication information from n sensors may alternatively be implemented in the following manner. Each of the n radars obtains radar detection information of the vehicle traveling environment, to obtain n pieces of radar detection information. Each of the n radars determines first traffic indication information of the traffic command target based on the radar detection information obtained by the radar, to obtain n pieces of first traffic indication information. Each of the n radars sends the corresponding first traffic indication information to the CPU. The CPU receives the first traffic indication information sent by each of the n radars, to obtain the n pieces of first traffic indication information.

Optionally, the n sensors may alternatively be traffic command target control apparatuses, and the obtaining n pieces of first traffic indication information from n sensors may alternatively be implemented in the following manner. The CPU receives n pieces of first traffic indication information sent by a V2X apparatus. The V2X apparatus is connected to the n traffic command target control apparatuses. The n traffic command target control apparatuses are configured to obtain the n pieces of first traffic indication information of the traffic command target.

Optionally, the n sensors may alternatively be RSUs disposed in a road sign infrastructure, and the obtaining n pieces of first traffic indication information from n sensors may alternatively be implemented in the following manner. The CPU receives n pieces of first traffic indication information sent by a V2X apparatus. The V2X apparatus is connected to the n RSUs. The n RSUs are configured to obtain the n pieces of first traffic indication information of the traffic command target.

Optionally, the n sensors may alternatively include n1 camera apparatuses, n2 radars, n3 traffic command target control apparatuses, and n4 RSUs, where n1, n2, n3, and n4 are all integers greater than or equal to 0, and n1+n2+n3+n4=n. The obtaining n pieces of first traffic indication information from n sensors may alternatively be implemented in the following manner. Each of the n1 camera apparatuses captures an image of the traveling environment in which the vehicle is located, to obtain n1 frames of images. Each of the n1 camera apparatuses obtains gesture information of the traffic command target based on the image obtained by the camera apparatus, to obtain n1 pieces of gesture information. Each of the n1 camera apparatuses determines first traffic indication information of the traffic command target based on the gesture information obtained by the camera apparatus, to obtain n1 pieces of first traffic indication information. Each of the n1 camera apparatuses sends the corresponding first traffic indication information to the CPU. The CPU receives the first traffic indication information sent by each of the n1 camera apparatuses, to obtain the n1 pieces of first traffic indication information. Each of the n2 radars obtains radar detection information of the traveling environment in which the vehicle is located, to obtain n2 pieces of radar detection information. Each of the n2 radars determines first traffic indication information of the traffic command target based on the radar detection information obtained by the radar, to obtain n2 pieces of first traffic indication information. Each of the n2 radars sends the corresponding first traffic indication information to the CPU. The CPU receives the first traffic indication information sent by each of the n2 radars, to obtain the n2 pieces of first traffic indication information. The CPU receives n3 pieces of first traffic indication information sent by a V2X apparatus. The V2X apparatus is connected to the n3 traffic command target control apparatuses. The n3 traffic command target control apparatuses are configured to obtain the n3 pieces of first traffic indication information of the traffic command target. The CPU receives n4 pieces of first traffic indication information sent by a V2X apparatus. The V2X apparatus is connected to the n4 RSUs. The n4 RSUs are configured to obtain the n4 pieces of first traffic indication information of the traffic command target. It should be noted that this disclosure does not limit an execution sequence of the CPU receiving the n1 pieces of first traffic indication information sent by the n1 camera apparatuses, the CPU receiving the n2 pieces of first traffic indication information sent by the n2 radars, the CPU receiving the n3 pieces of first traffic indication information sent by the V2X apparatus, and the CPU receiving the n4 pieces of first traffic indication information sent by the V2X apparatus.

Step S102: Determine second traffic indication information based on the n pieces of first traffic indication information.

The second traffic indication information is traffic indication information actually used when the vehicle travels.

There may be a plurality of implementations of determining the second traffic indication information based on the n pieces of first traffic indication information.

Optionally, the determining second traffic indication information based on the n pieces of first traffic indication information may be implemented in the following manner. The CPU groups same first traffic indication information in the n pieces of first traffic indication information into a traffic indication information set, and the traffic indication information set is referred to as a first traffic indication information set in the following. The CPU determines first traffic indication information corresponding to a first traffic indication information set that includes a largest quantity of pieces of first traffic indication information as the second traffic indication information.

Optionally, when obtaining the corresponding first traffic indication information, each of the n sensors may further obtain at least one of confidence information, tracking status information, time information, and location information of the traffic command target that correspond to the first traffic indication information, and send the obtained at least one of confidence information, tracking status information, time information, and location information of the traffic command target that correspond to the first traffic indication information to the CPU. That is, when receiving the first traffic indication information sent by each of the n sensors, the CPU may further receive, from the sensor, the at least one of confidence information, tracking status information, time information, and location information of the traffic command target that correspond to the first traffic indication information.

The confidence information that corresponds to the first traffic indication information is used to indicate accuracy of the first traffic indication information. Higher confidence in the confidence information corresponds to higher accuracy of the first traffic indication information. The tracking status information that corresponds to the first traffic indication information is used to indicate whether the first traffic indication information is obtained for the first time. The time information that corresponds to the first traffic indication information is used to indicate an obtaining time of the first traffic indication information. The location information of the traffic command target that corresponds to the first traffic indication information is used to indicate location coordinates of the traffic command target in the traveling environment in which the vehicle is located when the first traffic indication information is obtained.

Based on this, the determining second traffic indication information based on the n pieces of first traffic indication information may alternatively be implemented in the following manner. The CPU determines, based on the confidence information of the n pieces of first traffic indication information, first traffic indication information with highest confidence in the n pieces of first traffic indication information as the second traffic indication information.

In addition, in some optional embodiments of this disclosure, after receiving the n pieces of first traffic indication information sent by the n sensors, and the confidence information, the time information, and the location information of the traffic command target that correspond to each piece of the first traffic indication information, the CPU further sends the location information of the traffic command target and the time information to m sensors. The m sensors are different from the n sensors. That is, any one of the m sensors is different from any one of the n sensors, and m is an integer greater than or equal to 1.

Optionally, the CPU may send, to the m sensors, the time information and the location information of the traffic command target that correspond to the first traffic indication information with the highest confidence.

Optionally, the CPU may alternatively send, to the m sensors, the time information and the location information of the traffic command target that correspond to the first traffic indication information corresponding to the first traffic indication information set that includes the largest quantity of pieces of first traffic indication information.

Each of the m sensors may be a camera apparatus or a radar. After being turned on, the sensor may obtain an image or radar detection information of a vehicle traveling area. After receiving the location information of the traffic command target and the time information that are sent by the CPU, the sensor may determine, based on the location information of the traffic command target and the time information, traffic indication information from the obtained image or radar detection information, where the traffic indication information is referred to as third traffic indication information in the following.

After determining the corresponding third traffic indication information, each of the m sensors sends the third traffic indication information to the CPU. That is, the CPU may further receive the third traffic indication information sent by each of the m sensors, to obtain m pieces of third traffic indication information.

Based on this, the determining second traffic indication information based on the n pieces of first traffic indication information may alternatively be implemented in the following manner. Determine the second traffic indication information based on the n pieces of first traffic indication information and the m pieces of third traffic indication information.

Optionally, determining the second traffic indication information based on the n pieces of first traffic indication information and the m pieces of third traffic indication information may be implemented in the following manner. The CPU groups same traffic indication information in the n pieces of first traffic indication information and the m pieces of third traffic indication information into a traffic indication information set, where the traffic indication information set is referred to as a second traffic indication information set in the following. The CPU determines traffic indication information corresponding to a second traffic indication information set that includes a largest quantity of pieces of traffic indication information as the second traffic indication information.

Optionally, when obtaining the corresponding third traffic indication information, each of the m sensors may further obtain at least one of confidence information, tracking status information, time information, and location information of the traffic command target that correspond to the third traffic indication information, and send the at least one of confidence information, tracking status information, time information, and location information of the traffic command target that correspond to the third traffic indication information to the CPU. That is, the CPU may further receive, from each of the m sensors, the at least one of confidence information, tracking status information, time information, and location information of the traffic command target that correspond to the third traffic indication information.

Based on this, determining the second traffic indication information based on the n pieces of first traffic indication information and the m pieces of third traffic indication information may alternatively be implemented in the following manner. The CPU determines, based on the confidence information that corresponds to each of the n pieces of first traffic indication information and the confidence information that corresponds to each of the m pieces of third traffic indication information, traffic indication information with highest confidence in the n pieces of first traffic indication information and the m pieces of third traffic indication information as the second traffic indication information.

In addition, in the traffic indication information determining method according to this embodiment of this disclosure, traffic signal light information may be further obtained by using a sensor. The CPU may further receive the traffic signal light information sent by the sensor. The sensor may be any one of the n sensors, or may be any one of the m sensors. The sensor may be different from any one of the n sensors and the m sensors.

Based on this, optionally, the determining second traffic indication information based on the n pieces of first traffic indication information may alternatively be implemented in the following manner. Determine the second traffic indication information based on the n pieces of first traffic indication information and the traffic signal light information. To be specific, fourth traffic indication information may be first determined based on the n pieces of first traffic indication information. For a specific implementation, refer to the content of determining the second traffic indication information based on the n pieces of first traffic indication information in the foregoing embodiment. Details are not described herein again. Then, the second traffic indication information is determined based on the traffic signal light information and the fourth traffic indication information.

The following uses an example to describe how to determine the second traffic indication information based on the n pieces of first traffic indication information and the traffic signal light information.

For example, a traveling vehicle needs to turn left, and a left-turning signal light in traffic signal lights in front of the current vehicle is green. In this case, the traffic signal light information obtained by the vehicle includes that the vehicle can turn left. However, due to traffic congestion at a front intersection, a traffic police officer at the intersection indicates to stop turning left currently. In this case, the fourth traffic indication information obtained by the vehicle by using the n sensors includes that the vehicle stops turning left, and the second traffic indication information determined by the vehicle based on the fourth traffic indication information and the traffic signal light information is that the vehicle temporarily stops turning left. After one minute, the left-turning signal light in the traffic signal lights in front of the vehicle is still green. Therefore, the traffic signal light information obtained by the vehicle still includes that the vehicle can turn left. In addition, the traffic police officer indicates that the vehicle can turn left currently. In this case, the fourth traffic indication information obtained by the vehicle includes that the vehicle can turn left, and the second traffic indication information determined by the vehicle based on the fourth traffic indication information and the traffic signal light information is that the vehicle can turn left.

Optionally, determining second traffic indication information based on the n pieces of first traffic indication information may alternatively be implemented in the following manner. Determine the second traffic indication information based on the n pieces of first traffic indication information, the m pieces of third traffic indication information, and the traffic signal light information. For a specific implementation of determining the second traffic indication information based on the n pieces of first traffic indication information, the m pieces of third traffic indication information, and the traffic signal light information, refer to the content in the foregoing embodiment. Details are not described herein again.

In the traffic indication information determining method according to this embodiment of this disclosure, each of n sensors is used to obtain one piece of first traffic indication information, to obtain a total of n pieces of first traffic indication information. Then, second traffic indication information is determined based on the n pieces of first traffic indication information. The first traffic indication information is traffic indication information provided by a traffic command target (for example, a traffic police officer). Each piece of the first traffic indication information may provide a road traffic rule for a vehicle. The second traffic indication information is more accurate traffic indication information of the traffic command target obtained by comprehensively considering the n pieces of first traffic indication information. The vehicle travels according to a road traffic rule corresponding to the second traffic indication information. It can be learned that, in this solution, the traffic indication information of the traffic command target can be recognized, and more traffic indication information is provided in a traveling process of the vehicle, so that the vehicle travels more safely.

Figure 3:
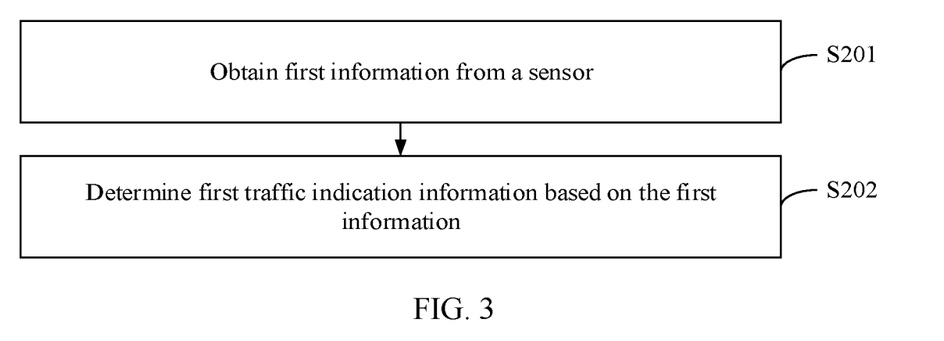
FIG. 3 is a schematic flowchart of a traffic indication information determining method according to another implementation of this disclosure.

FIG. 3 is a schematic flowchart of a traffic indication information determining method according to another implementation of this disclosure. An execution body of the method is a CPU. With reference to FIG. 3, it can be learned that the method includes the following steps.

Step S201: Obtain first information from a sensor.

The first information includes first indication information, and the first indication information is used to indicate a traffic command target. The first information further includes detection information, and time information and location information that are in the detection information and that correspond to the traffic command target. The detection information may include an image of a traveling environment in which a vehicle is located and/or radar detection information.

After being turned on, the sensor may periodically obtain the first information, and then send the obtained first information to the CPU. That is, the CPU may receive the first information sent by the sensor.

Step S202: Determine first traffic indication information based on the first information.

The first traffic indication information is used to provide a road traffic rule for the vehicle. In this embodiment, the first traffic indication information provides the road traffic rule when the vehicle actually travels.

After receiving the first information sent by the sensor, the CPU may determine an identity of the traffic command target based on the first indication information in the first information, and determine, based on the time information and the location information that correspond to the detection information in the first information, a time for obtaining the first detection information, and a coordinate range of the traffic command target corresponding to the time in the detection information. Then, the CPU may determine, from the detection information based on the coordinate range of the traffic command target and the corresponding time, detection information of the traffic command target that corresponds to the time, and finally determine the first traffic indication information based on the detection information of the traffic command target.

There may be a plurality of implementations of determining the first traffic indication information based on the detection information of the traffic command target.

Optionally, the detection information may be the image of the traveling environment in which the vehicle is located. In this case, the detection information of the traffic command target may be an image of the traffic command target. Determining the first traffic indication information based on the detection information of the traffic command target may be implemented in the following manner. The CPU obtains gesture information of the traffic command target based on the image of the traffic command target, and determines the first traffic indication information based on the gesture information.

Optionally, the detection information may alternatively be the radar detection information. In this case, the detection information of the traffic command target may alternatively be radar detection information of the traffic command target. Determining the first traffic indication information based on the detection information of the traffic command target may be implemented in the following manner. The CPU determines the first traffic indication information based on the radar detection information of the traffic command target.

In addition, in the traffic indication information determining method according to this embodiment, a sensor may further obtain traffic signal light information. It should be noted that a same sensor may obtain the first information and the traffic signal light information, or different sensors may separately obtain the first information and the traffic signal light information. This is not limited in this disclosure.

Based on this, the determining first traffic indication information based on the first information may alternatively be implemented in the following manner. Determine the first traffic indication information based on the first information and the traffic signal light information.

Determining the first traffic indication information based on the first information and the traffic signal light information may be implemented in the following manner. First, second traffic indication information is determined based on the first information. For a specific implementation, refer to the implementation of determining first traffic indication information based on the first information. Details are not described herein again. Then, the first traffic indication information is determined based on the second traffic indication information and the traffic signal light information. For a specific implementation, refer to the content in the embodiment shown in FIG. 2. Details are not described herein again.

In the traffic indication information determining method according to this embodiment, the CPU may obtain the first information from the sensor. The first information includes the first indication information, the detection information, and the time information and the location information that are in the detection information and that correspond to the traffic command target. After obtaining the first information, the CPU may determine, by using the first indication information, whether there is the traffic command target. When there is the traffic command target, the CPU may obtain, from the detection information based on the time information and the location information of the traffic command target, the traffic indication information of the traffic command target, namely, the first traffic indication information. The first traffic indication information may provide the road traffic rule for the vehicle. When there is the traffic command target (for example, a traffic police officer), the traffic indication information of the traffic command target usually has a highest priority. Therefore, it is safer when the vehicle travels according to the road traffic rule provided by the first traffic indication information.

The foregoing mainly describes the solutions according to embodiments of this disclosure from a perspective of interaction between network elements. It may be understood that, to implement the foregoing functions, each network element, for example, the CPU or the sensor, includes a corresponding hardware structure or software module for performing each function, or a combination thereof. A person skilled in the art should be easily aware that, with reference to units and algorithm steps in the examples described in embodiments disclosed in this specification, this disclosure can be implemented in a form of hardware or a combination of hardware and computer software. Whether a function is implemented by hardware or hardware driven by computer software depends on a particular application and a design constraint condition of the technical solutions. A person skilled in the art may use different methods to implement the described functions for each particular application, but it should not be considered that the implementation goes beyond the scope of this disclosure.

In embodiments of this disclosure, the CPU and the sensor may be divided into function modules based on the method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this disclosure, division into the modules is an example and is merely logical function division, and there may be another division during actual implementation. An example in which each function module is obtained through division based on each corresponding function is used below for description.

The foregoing describes in detail the methods according to embodiments of this disclosure with reference to FIG. 2 and FIG. 3. The following describes in detail a traffic indication information determining apparatus according to embodiments of this disclosure with reference to FIG. 4. It should be understood that descriptions of apparatus embodiments correspond to descriptions of the method embodiments. Therefore, for content not described in detail, refer to the method embodiments. For brevity, details are not described herein again.

Figure 4:
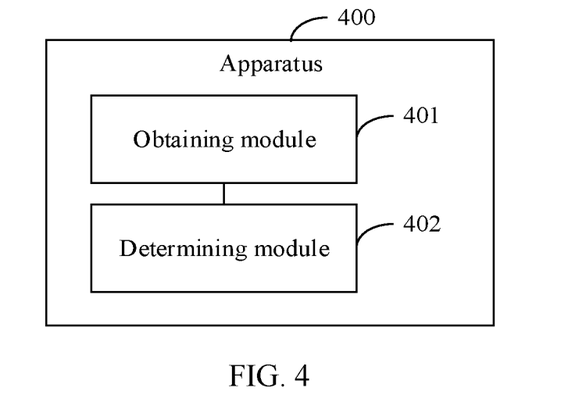
FIG. 4 is a block diagram of a structure of a traffic indication information determining apparatus according to an implementation of this disclosure.

FIG. 4 is a block diagram of a structure of a traffic indication information determining apparatus according to an implementation of this disclosure. As shown in FIG. 4, the apparatus 400 may include an obtaining module 401 and a determining module 402. The apparatus 400 may be configured to perform an action performed by the CPU in the method embodiments, or may be configured to perform an action performed by the sensor in the method embodiments.

For example, in a possible design, the obtaining module 401 may be configured to obtain n pieces of first traffic indication information from n sensors, where the first traffic indication information is used to indicate traffic indication information of a traffic command target, the traffic indication information is used to provide a road traffic rule for a vehicle, and n is an integer greater than or equal to 1, and the determining module 402 may be configured to determine second traffic indication information based on the n pieces of first traffic indication information.

Optionally, the traffic command target is a traffic police officer.

Optionally, the obtaining module 401 may be further configured to obtain, from the n sensors, at least one of confidence information, tracking status information, time information, and location information of the traffic command target that correspond to each piece of the first traffic indication information.

Optionally, the apparatus 400 may further include a sending module configured to send the location information of the traffic command target and the time information to m sensors. The m sensors are different from the n sensors.

Optionally, the obtaining module 401 may be further configured to obtain m pieces of third traffic indication information from the m sensors, where the third traffic indication information is traffic indication information determined based on the location information and the time information, and m is an integer greater than or equal to 1.

Optionally, the determining module 402 is further configured to determine the second traffic indication information based on the n pieces of first traffic indication information and the m pieces of third traffic indication information.

Optionally, the obtaining module 401 may be further configured to obtain traffic signal light information. The traffic signal light information is used to determine the second traffic indication information.

In another possible design, the obtaining module 401 may alternatively be configured to obtain first information from a sensor. The first information includes first indication information. The first indication information is used to indicate a traffic command target. The first information further includes detection information, and time information and location information that are in the detection information and that correspond to the traffic command target. The determining module 402 may alternatively be configured to determine first traffic indication information based on the first information, where the first traffic indication information is used to provide a road traffic rule for a vehicle.

Optionally, the traffic command target is a traffic police officer.

Optionally, the obtaining module 401 may be further configured to obtain traffic signal light information, and the determining module 402 may be further configured to determine the first traffic indication information based on the traffic signal light information and the first information.

That is, the apparatus 400 may implement corresponding steps or procedures performed by the CPU or the sensor in the method shown in FIG. 2 or FIG. 3 according to embodiments of this disclosure. The apparatus 400 may include a module configured to perform the method performed by the CPU or the sensor in the method shown in FIG. 2 or FIG. 3. In addition, the modules in the apparatus 400 and the foregoing other operations and/or functions are separately configured to or used to implement corresponding steps of the method shown in FIG. 2 or FIG. 3. For example, in a possible design, the obtaining module 401 in the apparatus 400 may be configured to perform step S101 in the method shown in FIG. 2, and the determining module 402 may be configured to perform step S102 in the method shown in FIG. 2. In another possible design, the obtaining module 401 in the apparatus 400 may be configured to perform step S201 in the method shown in FIG. 3, and the determining module 402 may be configured to perform step S202 in the method shown in FIG. 3.

It should be understood that, a specific process of each module performing the corresponding step has been described in detail in the method embodiments. For brevity, details are not described herein again.

An embodiment of this disclosure further provides a processing apparatus, including a processor and an interface. The processor may be configured to perform the methods in the method embodiments.

Figure 5:
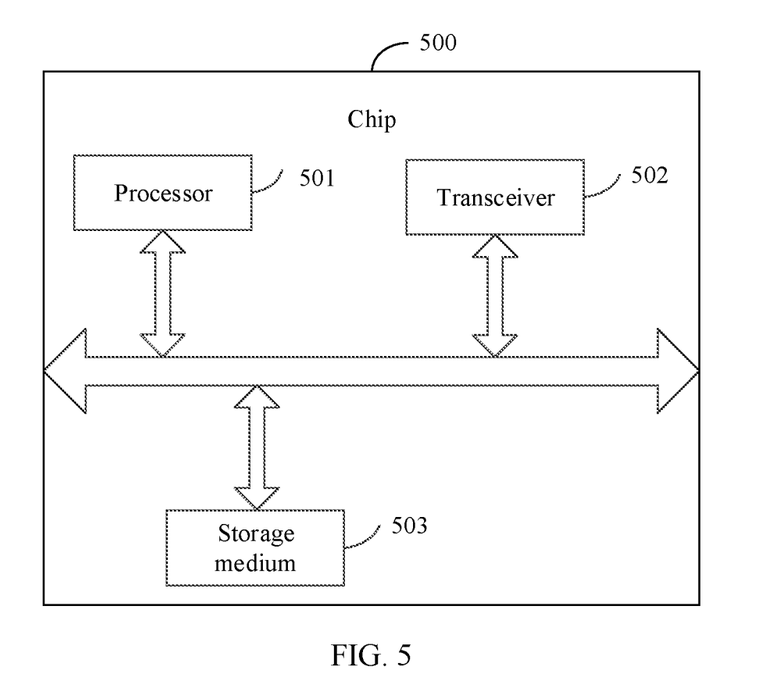
FIG. 5 is a block diagram of a structure of a chip according to an implementation of this disclosure.

It should be understood that the processing apparatus may be a chip. FIG. 5 is a block diagram of a structure of a chip according to an implementation of this disclosure. The chip shown in FIG. 5 may be a general-purpose processor, or may be a dedicated processor. The chip 500 includes a processor 501. The processor 501 may be configured to support the apparatus shown in FIG. 4 in performing the technical solution shown in FIG. 2, or configured to support the apparatus shown in FIG. 4 in performing the technical solution shown in FIG. 3.

Optionally, the chip may further include a transceiver 502. The transceiver 502 is configured to receive control of the processor 501, to support the apparatus shown in FIG. 4 in performing the technical solution shown in FIG. 2, or support the apparatus shown in FIG. 4 in performing the technical solution shown in FIG. 3. Optionally, the chip shown in FIG. 5 may further include a storage medium 503.

It should be noted that the chip shown in FIG. 5 may be implemented by using the following circuits or components: one or more field-programmable gate arrays (FPGAs), programmable logic devices (PLDs), application-specific integrated circuit (ASIC) chips, system on chips (SoCs), CPUs, network processors (NPs), digital signal processing circuits (DSPs), micro controller units (MCUs), controllers, state machines, gate logic, discrete hardware components, any other suitable circuits, or any combination of circuits that can perform various functions described in this disclosure.

In an implementation process, steps in the foregoing methods can be implemented by using a hardware integrated logical circuit in the processor, or by using instructions in a form of software. The steps of the methods disclosed with reference to embodiments of this disclosure may be directly performed and completed by a hardware processor, or may be performed and completed by using a combination of hardware and software modules in the processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads information in the memory and completes the steps in the methods in combination with hardware in the processor. To avoid repetition, details are not described herein again.

It should be noted that the processor in embodiments of this disclosure may be an integrated circuit chip, and has a signal processing capability. In an implementation process, the steps of the method embodiments can be implemented by using a hardware integrated logic circuit in the processor or by using software instructions. The foregoing processor may be a general-purpose processor, a DSP, an ASIC, an FPGA or another PLD, a discrete gate or a transistor logic device, or a discrete hardware component. The processor may implement or perform the methods, the steps, and the logical block diagrams that are disclosed in embodiments of this disclosure. The general-purpose processor may be a microprocessor, or the processor may be any conventional processor or the like. The steps of the methods disclosed with reference to embodiments of this disclosure may be directly performed and completed by a hardware decoding processor, or may be performed and completed by using a combination of hardware in the decoding processor and a software module. The software module may be located in a mature storage medium in the art, such as a RAM, a flash memory, a ROM, a PROM, an EEPROM, or a register. The storage medium is located in the memory, and the processor reads information in the memory and completes the steps in the methods in combination with hardware in the processor.

It may be understood that, the memory in embodiments of this disclosure may be a volatile memory or a nonvolatile memory, or may include both a volatile memory and a nonvolatile memory. The nonvolatile memory may be a ROM, a PROM, an erasable PROM (EPROM), an EEPROM, or a flash memory. The volatile memory may be a RAM that is used as an external cache. Through exemplary but not limitative descriptions, many forms of RAMs are available, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that the memories in the system and the methods described in this specification include but are not limited to these memories and any memory of another suitable type.

Based on the methods according to embodiments of this disclosure, embodiments of this disclosure further provide a computer program product. The computer program product includes a computer program or instructions. When the computer program or the instructions is run on a computer, the computer is enabled to perform any method embodiment shown in FIG. 2 or FIG. 3.

Based on the methods according to embodiments of this disclosure, embodiments of this disclosure further provide a computer storage medium. The computer storage medium stores a computer program or instructions. When the computer program or the instructions is run on a computer, the computer is enabled to perform any method embodiment shown in FIG. 2 or FIG. 3.

The traffic indication information determining apparatus, the computer storage medium, the computer program product, and the chip according to embodiments of this disclosure are all configured to perform the methods provided above. Therefore, for beneficial effects that can be achieved by the apparatus, the computer storage medium, the computer program product, and the chip, refer to beneficial effects corresponding to the method provided above. Details are not described herein again.

All or some of embodiments may be implemented by using software, hardware, firmware, or any combination thereof. When the software is used for implementation, all or some of embodiments may be implemented in a form of a computer program product. The computer program product includes one or more computer programs or instructions. When the computer programs or instructions are loaded and executed on a computer, all or some of the procedures or the functions in embodiments of this disclosure are generated. The computer may be a general-purpose computer, a dedicated computer, a computer network, or another programmable apparatus. The computer programs or instructions may be stored in a computer-readable storage medium or may be transmitted from a computer-readable storage medium to another computer-readable storage medium. For example, the computer programs or instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density DIGITAL VERSATILE DISC (DVD)), a semiconductor medium (for example, a solid-state disk (SSD)), or the like.

Terms such as "component", "module", and "system" used in this specification are used to indicate computer-related entities, hardware, firmware, combinations of hardware and software, software, or software being executed. For example, the component may be, but is not limited to, a process that is run on a processor, a processor, an object, an executable file, an execution thread, a program, and/or a computer. As illustrated by using the figures, both an application and a computing device that are run on a computing device may be components. One or more components may reside within a process and/or an execution thread, and the component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, various illustrative logical blocks and steps that are described with reference to embodiments disclosed in this specification can be implemented by electronic hardware or a combination of computer software and electronic hardware. Whether the functions are implemented by hardware or software depends on a particular application and a design constraint condition of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and module, refer to a corresponding process in the method embodiments. Details are not described herein again.

In the several embodiments according to this disclosure, it should be understood that the disclosed system, apparatuses, and methods may be implemented in another manner. For example, the described apparatus embodiment is merely an example. For example, division into the modules is merely logical function division and there may be another division manner during actual implementation. For example, a plurality of modules or components may be combined or integrated into another system, or some features may be ignored or not implemented. In addition, displayed or discussed mutual couplings or direct couplings or communication connections may be implemented by using some interfaces. Indirect couplings or communication connections between apparatuses or units may be implemented in an electrical, a mechanical, or another form.

The modules described as discrete components may or may not be physically separate, and components displayed as the modules may or may not be physical units. That is, the components may be located in one position, or may be distributed on a plurality of network units. The embodiment solutions may be implemented by selecting some or all of the units based on actual requirements.

In addition, functional modules in embodiments of this disclosure may be integrated into one processing unit, or each of the modules may stand alone physically, or two or more modules may be integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or a compact disc (CD).

It should be understood that, in embodiments of this disclosure, an execution sequence of the steps should be determined based on functions and internal logic of the steps. Sequence numbers of the steps do not mean the execution sequence, and do not constitute any limitation on an implementation process of embodiments.

All parts in this specification are described in a progressive manner, for same or similar parts in embodiments, embodiments may refer to each other, and each embodiment focuses on a difference from the other embodiments. Especially, embodiments of the traffic indication information determining apparatus, the computer storage medium, the computer program product, and the chip are basically similar to the method embodiments, and therefore are described briefly. For related parts, refer to descriptions in the method embodiments.

Although some preferred embodiments of this disclosure have been described, a person skilled in the art can make changes and modifications to these embodiments once the person skilled in the art learns of a basic creative concept. Therefore, following claims are intended to be construed as to cover the preferred embodiments and all changes and modifications falling within the scope of this disclosure.

The descriptions of implementations of this disclosure do not limit the protection scope of this disclosure.

What is claimed is:

1. A method comprising:
obtaining, from n sensors, n pieces of first traffic indication information, wherein the first traffic indication information comprises n pieces of gesture information of a traffic police officer, and wherein n is an integer greater than or equal to one;
obtaining confidence information corresponding to the n pieces of first traffic indication information;
providing a road traffic rule; and
controlling, based on the n pieces of the first traffic indication information and the road traffic rule, a vehicle.

2. The method of claim 1, further comprising obtaining, from the n sensors, at least one of: tracking status information, time information, or location information.

3. The method of claim 2, further comprising sending, to m sensors, the location information and the time information, wherein the m sensors are different from the n sensors, and wherein m is an integer greater than or equal to one.

4. The method of claim 3, further comprising obtaining, from the m sensors, m pieces of traffic indication information based on the location information and the time information.

5. The method of claim 4, wherein the vehicle is further controlled based on the m pieces of traffic indication information.

6. The method of claim 1, wherein controlling the vehicle is further based on traffic signal light information.

7. An apparatus, comprising:
a memory configured to store instructions; and
one or more processors coupled to the memory and configured to execute the instructions to cause the apparatus to:
obtain, from n sensors, n pieces of first traffic indication information, wherein the first traffic indication information comprises n pieces of gesture information of a traffic police officer, and wherein n is an integer greater than or equal to one;
obtain confidence information corresponding to the n pieces of first traffic indication information;
provide a road traffic rule for a vehicle; and
control the vehicle based on the n pieces of the first traffic indication information and the road traffic rule.

8. The apparatus of claim 7, wherein the one or more processors are further configured to execute the instructions to cause the apparatus to obtain from the n sensors, at least one of tracking status information, time information, or location information.

9. The apparatus of claim 8, wherein the one or more processors are further configured to execute the instructions to cause the apparatus to send, to m sensors, the location information and the time information, wherein the m sensors are different from the n sensors, and wherein m is an integer greater than or equal to one.

10. The apparatus of claim 9, wherein the one or more processors are further configured to execute the instructions to cause the apparatus to obtain, from the m sensors, m pieces of traffic indication information based on the location information and the time information.

11. The apparatus of claim 10, wherein the one or more processors are further configured to execute the instructions to cause the apparatus to further base the control of the vehicle on the m pieces of traffic indication information.

12. The apparatus of claim 7, wherein the one or more processors are further configured to execute the instructions to cause the apparatus to further base the control of the vehicle on traffic signal light information.

13. A computer program product comprising computer-executable instructions that are stored on a non-transitory computer-readable medium and that, when executed by one or more processors, cause an apparatus to:
obtain, from n sensors, n pieces of first traffic indication information, wherein the first traffic indication information comprises n pieces of gesture information of a traffic police officer, and wherein n is an integer greater than or equal to one;
obtain confidence information corresponding to the n pieces of first traffic indication information;
provide a road traffic rule for a vehicle; and
control the vehicle based on the n pieces of the first traffic indication information and the road traffic rule.

14. The computer program product of claim 13, wherein the computer-executable instructions further cause the apparatus to obtain, from the n sensors, at least one of: tracking status information, time information, or location information.

15. The computer program product of claim 14, wherein the computer-executable instructions further cause the apparatus to send, to m sensors, the location information and the time information, wherein the m sensors are different from the n sensors, and wherein m is an integer greater than or equal to one.

16. The computer program product of claim 15, wherein the computer-executable instructions further cause the apparatus to obtain, from the m sensors, m pieces of traffic indication information based on the location information and the time information.

17. The computer program product of claim 16, wherein the computer-executable instructions further cause the apparatus to further base the control of the vehicle on the m pieces of traffic indication information.

18. The computer program product of claim 13, wherein the computer-executable instructions further cause the apparatus to further base the control of the vehicle on traffic signal light information.

19. The method of claim 4, further comprising obtaining, from the m sensors and based on radar, m pieces of traffic indication information the location information.

20. The apparatus of claim 9, wherein each of the m sensors comprise radar apparatus.

* * * * *